US008781785B2

(12) United States Patent
Kamijima et al.

(10) Patent No.: US 8,781,785 B2
(45) Date of Patent: Jul. 15, 2014

(54) INFORMATION PROCESSING METHOD, AND RECORDING MEDIUM AND INFORMATION PROCESSING APPARATUS THEREFOR

(75) Inventors: Kyoichi Kamijima, Shiojiri (JP); Toshihiro Shima, Shiojiri (JP); Yuki Dogo, Kagoshima (JP); Byonhee Ryu, Kagoshima (JP)

(73) Assignee: Seiko Epson Corporation, Tokyo (JP)

( * ) Notice: Subject to any disclaimer, the term of this patent is extended or adjusted under 35 U.S.C. 154(b) by 857 days.

(21) Appl. No.: 12/571,861

(22) Filed: Oct. 1, 2009

(65) Prior Publication Data

US 2010/0131223 A1    May 27, 2010

(30) Foreign Application Priority Data

Nov. 25, 2008    (JP) ................................. 2008-299572

(51) Int. Cl.
*G01D 1/00*     (2006.01)
*H04L 12/26*    (2006.01)

(52) U.S. Cl.
CPC ............ *H04L 12/2697* (2013.01); *H04L 43/50* (2013.01)
USPC ........................................................ 702/122

(58) Field of Classification Search
CPC ........................... H04L 43/50; H04L 12/2697
USPC .......................................... 702/122; 709/223
See application file for complete search history.

(56) References Cited

U.S. PATENT DOCUMENTS

| 5,822,520 A | 10/1998 | Parker ........................ 395/200.6 |
| 2007/0288623 A1 * | 12/2007 | Kato et al. .................... 709/223 |
| 2010/0100767 A1 * | 4/2010 | Liu et al. ......................... 714/28 |

FOREIGN PATENT DOCUMENTS

JP    09-326796    12/1997

* cited by examiner

*Primary Examiner* — Tung S Lau
*Assistant Examiner* — Xiuquin Sun
(74) *Attorney, Agent, or Firm* — DLA Piper LLP (US)

(57) ABSTRACT

An information processing method for evaluating a communication state of a device, includes: (a) obtaining communication data including content of communication between a plurality of devices; (b) creating a first test program on the basis of the content of communication included in the communication data obtained in (a), the first test program to be executed when performing communication between a test-target device and another device; and (c) executing the first test program created in (b) and generating performance results regarding communication performed between the test-target device and the other device.

13 Claims, 9 Drawing Sheets

| NO. | ELAPSED TIME | SOURCE | DESTINATION | TCP/UDP | DATA |
|---|---|---|---|---|---|
| 1 | 1 | 10.0.1.100 | 10.0.1.200 | UDP | DO YOU PROVIDE SERVICE XX? |
| 2 | 5 | 10.0.1.1 | 10.0.1.2 | UDP | ・・・・・ |
| 3 | 10 | 10.0.1.200 | 10.0.1.100 | UDP | YES, I PROVIDE IT |
| 4 | 30 | 10.0.1.2 | 10.0.1.1 | UDP | ・・・・・ |
| 5 | 31 | 10.0.1.1 | 10.0.1.2 | UDP | ・・・・・ |
| 6 | 100 | 10.0.1.100 | 10.0.1.200 | TCP | WHO ARE YOU? |
| 7 | 102 | 10.0.1.200 | 10.0.1.100 | TCP | I AM LP-500 |

⬇ FILTERING PROCESSING

| NO. | ELAPSED TIME | SOURCE | DESTINATION | TCP/UDP | DATA |
|---|---|---|---|---|---|
| 1 | 1 | 10.0.1.100 | 10.0.1.200 | UDP | DO YOU PROVIDE SERVICE XX? |
| 2 | 10 | 10.0.1.200 | 10.0.1.100 | UDP | YES, I PROVIDE IT |
| 3 | 100 | 10.0.1.100 | 10.0.1.200 | TCP | WHO ARE YOU? |
| 4 | 102 | 10.0.1.200 | 10.0.1.100 | TCP | I AM LP-500 |

FIG. 5

```
##Evaluation tool automatic creation program      ⎤
##Creation date ....                              ⎬ 54
##Creator ....                                    
##Summary
#!/usr/bin/ ....
   require "socket"

init* * * * * * * * * * * * * *                   ⎤
#Fundamental information                          
   serverip="10.0.1.200"                          
   clientip="10.0.1.100"                          
#Flow information                                 
#1                                                
   port1=1000                                     
   data1="Do you provide service xx?"             ⎬ 54a
#2                                                
   port2=2000                                     
   data2="Yes, I provide it"                      
#3                                                
   port3=3000                                     
   data3="Who are you?"                           
#4                                                
   data4="I am LP-500"

#main# # # # # # # # # # # # # #                  ⎤
#Note: From main is source comparison target      
        of evaluation tool                        
#1: Sending                                       
#Summary:                                         
   s0=UDPSocket.open()                            
   s0=connect(serverip,port1)                     
   s0=send(data1,0)                               
#2: Receiving                                     
#Summary:                                         
   response=s0.recv(port1,0)                      
   s0.close                                       
ASSERT (response==data2)                          ⎬ 54b
#3: Sending                                       
#Summary:                                         
   sleep90                                        
   s1=TCPSocket.open(serverip,port3)              
   s1.close                                       
#4: Receiving                                     
#Summary:                                         
Rreaddata1=s1.read()                              
s1.close                                          
ASSERT (readdata1==data4)                         
```

INFORMATION PROCESSING METHOD, AND RECORDING MEDIUM AND INFORMATION PROCESSING APPARATUS THEREFOR

BACKGROUND

1. Technical Field

The present invention relates to an information processing method, and to a program and information processing apparatus therefor. More particularly, the invention relates to an information processing method for evaluating a communication state of a device, and to a program and an information processing apparatus therefor.

2. Related Art

To date, information processing methods have been proposed that test a network protocol apparatus from various perspectives by using packets having a data structure in which, among data that correspond to individual protocol layers, are disposed in a serial format and are used for simulation, data representing a lower-level layer is arranged in front of data representing an upper-level layer (see, for example, JP-A-9-326796).

SUMMARY

However, in the information processing method disclosed in JP-A-9-326796, since packets can be used in a range of differing layers such as a network protocol layer, a transport layer and the like and packets are described using, for example, binary data and specific formats, analysis of the content of communication of the packets is not easy.

An advantage of some aspects of the invention is that it provides an information processing method that is capable of more easily evaluating a communication state of a device, and a program and an information processing apparatus therefor.

An information processing method for evaluating a communication state of a device, according to an aspect of the invention, includes (a) obtaining communication data that includes content of communication between a plurality of devices; (b) creating a first test program on the basis of the content of communication included in the communication data obtained in (a), the first test program to be executed when performing communication between a test-target device and another device; and (c) executing the first test program created in (b) and generating performance results regarding communication performed between the test-target device and the other device.

The information processing method evaluates a communication state of a device by obtaining communication data that includes content of communication between a plurality of devices, creating a first test program on the basis of the content of communication included in the obtained communication data, the first test program to be executed when performing communication between a test-target device and another device, executing the created first test program and generating performance results regarding communication performed between the test-target device and the other device. In this way, the test program is created by using communication data that has actually been communicated and communication testing of the test-target device is performed by using this test program. Consequently, for example, communication testing can be made more automatic, communication between the test-target device and the other device can be optimized by using the performance results regarding the performed communication and this test program can be used in the development of new devices. Therefore, the communication state of a device can be evaluated more easily. Here, the information processing method is not particularly limited as long as it is a method that can obtain data of communication between a test-target device and another device, and it may be a method to be performed by the test-target device, it may be a method to be performed by the other device that communicates with the test-target device, it may be a method to be performed by another device that does not communicate with the test-target device, and it may be a method to be performed by a third device rather than the test-target device or the other device. Furthermore, the test program may include evaluation conditions determined on the basis of content of communication.

The information processing method according to the aspect of the invention may further include (d) obtaining communication data that includes content of communication performed between the test-target device and the other device when executing the first test program created in (b), (e) creating a second test program on the basis of the content of communication included in the communication data obtained in (d), the second test program to be executed when performing communication between the test-target device and the other device, and (f) outputting difference information obtained by comparing at least one part of content between the first test program created in (b) and the second test program created in (e). When these steps are included, differences between the content of communication in the first test program and the content of communication in the second test program can be more easily evaluated by using the difference information. For example, in the case where the first test program has been created by an old device and the second test program has been created by a new device, since the differences between the communication states of the old and new devices can be easily grasped, development of devices becomes easier. At this time, in (f), comparison of at least one part of content may be performed between the first and second test programs and difference information may be output that includes at least one of an evaluation condition that does not match between the first and second test programs and an evaluation condition that has changed between the first and second test programs. Here, the information processing method according to the aspect of the invention may further include (g) excluding predetermined test conditions from evaluation conditions by using the difference information and creating a third test program that is to be executed when performing communication between the test-target device and the other device. When this step is included, the process of evaluating a communication state can provide a greater variety of ways of evaluating the communication state, since a new test program can be created by using the difference information. At this time, the test conditions that do not match between the first and second test programs may be excluded from the evaluation conditions and the third test program may be created.

In the information processing method according to the aspect of the invention, in (a), communication data may be obtained that includes content of communication between a device, which is different from the test-target device, and the other device, in (b), the first test program may be created on the basis of content of communication between the device, which is different from the test-target device, and the other device obtained in (a), and in (c), the first test program created in (b) may be executed and performance results may be generated regarding communication performed between the test-target device and the other device. When these steps are performed, differences between the content of communication with the device, which is different from the test-target device, and the content of communication with the test-target device can be more easily evaluated.

In the information processing method according to the aspect of the invention, in (a), communication data may be obtained, that includes content of communication between the test-target device and the other device. When this communication data is obtained, content of communication of the test-target device can be reproduced from the test program.

Alternatively, the information processing method according to the aspect of the invention may include repeatedly performing (a) and (b) and creating a plurality of first test programs, and may further include (h) performing comparison of at least one part of content between the plurality of first test programs created in (b) and outputting difference information that includes at least one of an evaluation condition that always does not match between the plurality of first test programs and an evaluation condition that always changes between the plurality of first test programs. When these steps are performed, evaluation can be more easily performed for content of repeatedly performed communication. At this time, the information processing method according to the aspect of the invention may further include (i) excluding predetermined test conditions from evaluation targets by using the difference information and creating a fourth test program, the fourth test program to be executed when performing communication between the test-target device and the other device. By repeatedly performing communication, for example, an evaluation condition that always does not match and an evaluation condition that always changes can be extracted, and thus a test program can be created that has been narrowed down to content of communication more desired to be evaluated and the communication state of a device can be more easily evaluated.

In the information processing method according to the aspect of the invention, in (c), communication data may be obtained that includes content of communication performed between the test-target device and the other device when executing the first test program created in (b), performance results may be generated regarding whether content included in the obtained communication data was able to be communicated or not and the generated performance results may be output in a visible manner. When these steps are performed, the performance results regarding whether or not communication was able to be performed between the devices can be confirmed visually.

In the information processing method according to the aspect of the invention, in (b), a program for testing content may be created, in which content of communication included in communication data is reproduced. When this step is performed, whether or not the communication state of a device has been normally reproduced can be more easily evaluated.

In the information processing method according to the aspect of the invention, in (b), the first test program may be created to include an evaluation condition area in which an evaluation condition is recorded under which communication between the test-target device and the other device is to be tested and a reference information area in which an evaluation condition is recorded that is not to be used in the test. For example, sometimes conditions other than evaluation conditions that are desired to be evaluated are also included in content of communication obtained from communication data, but, when the above step is performed, since the conditions not to be used in the evaluation are simply shifted to the reference information area, evaluated results are more easily reflected in the test program.

A program according to another aspect of the invention is a program for implementing each step of the above-described information processing method in one or a plurality of computers. This program may be recorded on a computer-readable recording medium (for example, a hard disk, ROM, FD, CD, DVD, or the like), may be distributed to another computer from the computer by using a transmission medium (communication network such as the Internet, a LAN or the like) or may be distributed in another form. When the program is executed on a single computer or executed by allocating individual steps of the information processing method among a plurality of computers, the individual steps of the above-described information processing method are executed and thus an operation result that is the same as that of the information processing method can be obtained.

An information processing apparatus according to a further aspect of the invention that evaluates a communication state of a device, includes a communication obtaining unit that obtains communication data that includes content of communication between a plurality of devices; a program creating unit that creates a first test program on the basis of the content of communication included in the obtained communication data, the first test program to be executed when performing communication between a test-target device and another device; and a result generating unit that executes the created first test program and generates performance results regarding communication performed between the test-target device and the other device.

The information processing apparatus creates the first test program by using communication data that has actually been communicated similarly to the above-described information processing method and then performs testing of the test-subject device by using the test program. Consequently, the communication status of a device can be more easily evaluated. In the information-processing apparatus, a configuration may be adopted that performs the various steps of the above-described information processing method, and, such a configuration may be added that each function of the above-described information processing method is implemented.

For example, in the information processing apparatus according to the further aspect of the invention, the communication obtaining unit obtains communication data that includes content of communication performed between the test-target device and the other device when executing the created first test program, the program creating unit creates a second test program on the basis of content of communication included in the communication data obtained when executing the first test program, the second test program to be executed when performing communication between the test-target device and the other device, and the information processing apparatus may further include a difference information outputting unit that outputs difference information obtained by comparing at least one part of content between the created first test program and the created second test program. At this time, the program creating unit may exclude predetermined test conditions from evaluation conditions by using the difference information and create a third test program that is to be executed when performing communication between the test-target device and the other device. In the information processing apparatus according to the further aspect of the invention, the communication obtaining unit may obtain communication data that includes content of communication between a device, which is different from the test-target device, and the other device, the program creating unit may create the first test program on the basis of the obtained content of communication between the device, which is different from the test-target device, and the other device, and the result generating unit may execute the created first test program and generate performance results regarding communication performed between the test-target device and, the other device. Alternatively, in the information processing apparatus according to the further aspect of the invention, the communication obtaining unit may obtain communication data that includes content of communication between the test-target device and the other device. At this time, the communication obtaining unit may obtain communication data that includes content of communication between the plurality of devices and the program creating unit may repeatedly perform processing that creates the first test program that performs communication between the test-target device and the other device, on the basis of the content of communication included in the obtained communication data and create a plurality of first test programs, and the information processing apparatus may further include a difference information outputting unit that compares content of at least one part of content between the plurality of first test programs and outputs difference information that includes at least one of an evaluation condition that always does not change between the plurality of created first test programs and an evaluation condition that always changes between the plurality of first test programs. At this time, the program creating unit may exclude predetermined test conditions from evaluation targets by using the difference information and create a fourth test program that is to be executed when performing communication between the test-target device and the other device. In the information processing apparatus according to the further aspect of the invention, the results generating unit may obtain communication data that includes content of communication performed between the test-target device and the other device when executing the created first test program and may generate performance results regarding whether or not content included in the communication data obtained by the communication obtaining unit was able to be communicated and may output the generated performance results in a visually recognizable manner. In the information processing apparatus according to the further aspect of the invention, the program creating unit may create a program for testing content, in which content of communication included in communication data is reproduced. In the information processing apparatus according to the further aspect of the invention, the program creating unit may create the first test program to include an evaluation condition area in which an evaluation condition is recorded under which communication between the test-target device and the other device is to be tested and a reference information area in which an evaluation condition is recorded that is not to be used in the test.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
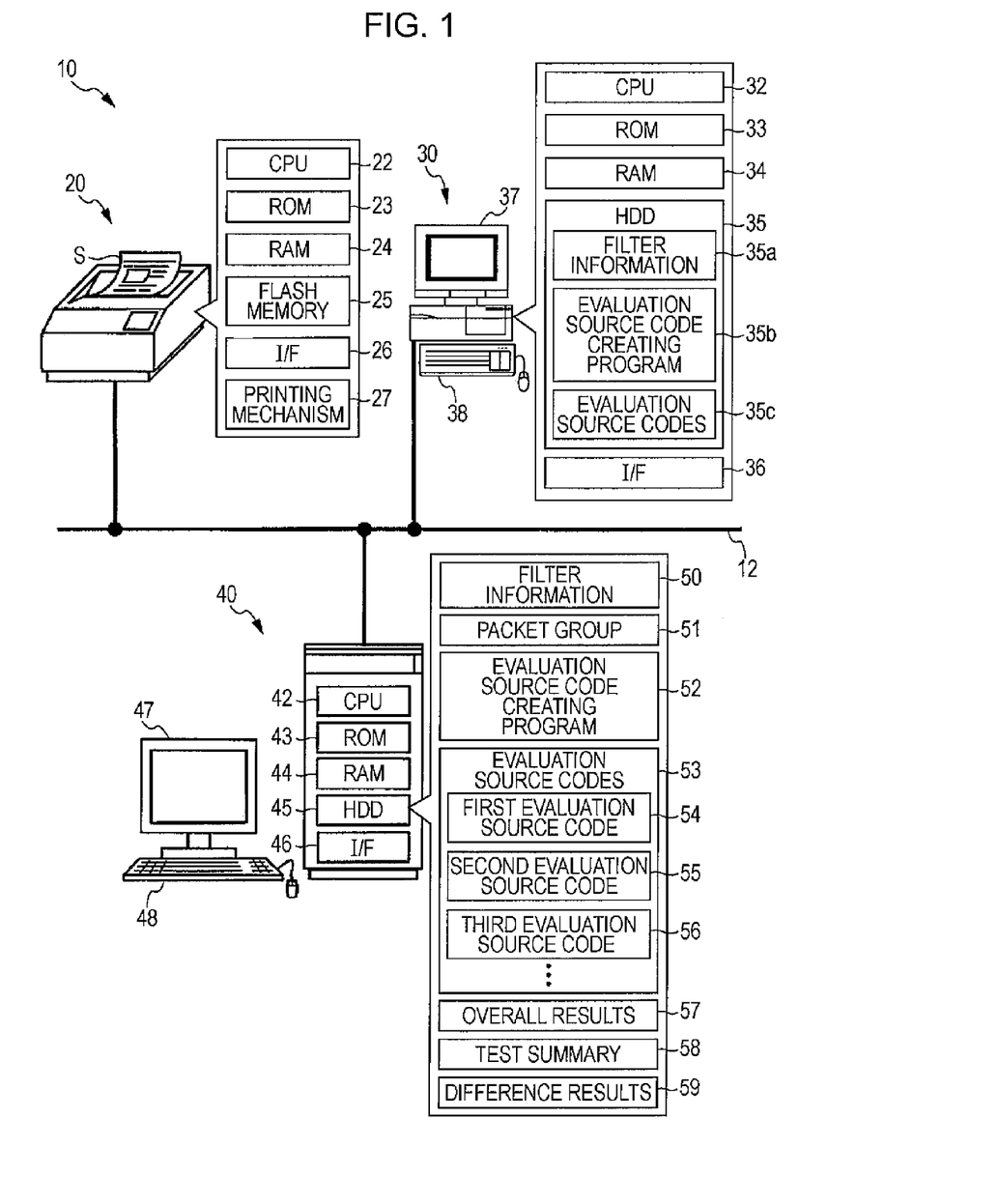
FIG. 1 is a structural view illustrating an outline configuration of a communication evaluation system 10.
Figure 2:
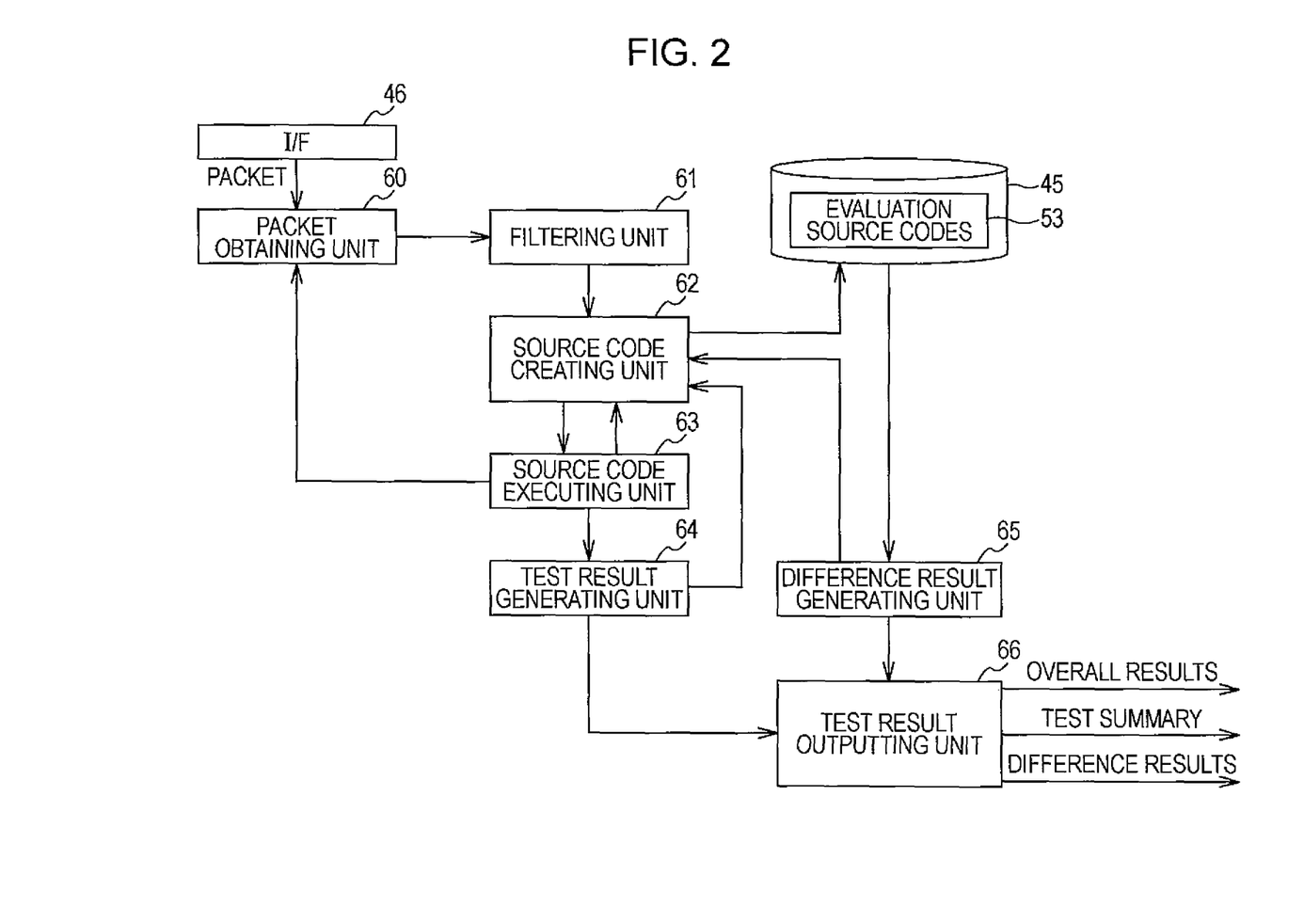
FIG. 2 is a block diagram illustrating an example of a functional structure of an evaluation PC 40.

Hereafter, a preferred embodiment of the invention will be described with reference to the drawings. FIG. 1 is a structural diagram illustrating an outline of a configuration of a communication evaluation system 10 according to an embodiment of the invention and FIG. 2 is a block diagram illustrating an example of a functional structure of an evaluation PC 40. The communication evaluation system 10 according to the embodiment includes a printer 20 that is connected to a LAN 12 serving as a network, a user personal computer (hereafter, "user PC") 30 that is connected to the LAN 12, and an evaluation personal computer (hereafter, "evaluation PC") 40 that evaluates a communication state and is connected to the LAN 12. Here, the communication evaluation system 10 will be described as an example of a system that is used in a development environment in which printers are developed by referring to a communication operation of a printer 20, which is an existing printing apparatus, the printers being developed performing a new communication mode. Here, the printer 20 is an existing printer and the evaluation PC 40, to be described below, is a PC provided with a printer-simulation function into which a new communication mode possessed by a new printer has been incorporated. In the communication evaluation system 10, although only one of each of a printer, user PC and an evaluation PC are shown, an arbitrary number of each may be provided.

The printer 20 is an apparatus that prints print jobs obtained through the LAN 12 onto recording paper sheets S. The printer 20 is provided with a CPU 22 that governs control of the entirety of the apparatus, a flash memory 25 that stores data, a ROM 23 in which various processing programs have been stored, a RAM 24 that temporarily stores data, a network interface (I/F) 26 capable of sending and receiving signals to and from external apparatuses connected to the LAN 12, and a printing mechanism 27 that performs printing onto the recording paper sheets S by using toner serving as coloring agent. The printing mechanism 27 is a full-color electrophotographic printing mechanism that adopts a single photosensitive member system and an intermediate transfer system. The printing mechanism 27 may adopt an ink jet system that discharges ink toward a recording sheet S by pressurizing ink within an ink cartridge by using a piezoelectric element or a heater provided inside a print head.

The user PC 30 is a known general-purpose personal computer that constitutes an information processing apparatus used by a user. The user PC 30 is provided with a CPU 32 that performs various control operations, a ROM 33 that stores various control programs, a RAM 34 that temporarily stores data, a HDD 35 which is a large capacity memory and stores various application programs and various data files, and an I/F 36 that is capable of sending and receiving information to and from external apparatuses connected to the LAN 12. In the HDD 35, data such as filter information 35*a* used when obtaining specific packets, an evaluation source code creating program 35*b* that creates evaluation source codes 35*c* that evaluate a communication state, and the evaluation source codes 35*c* that are executed when evaluating a communication state, are stored as communication data. The user PC 30 sends print jobs to the printer 20 by using a program installed therein and receives status information from the printer 20. The user PC 30 is further provided with a display 37 that displays various information on a screen, an input device 38 such as a keyboard or the like with which a user inputs various commands, and the like. The user PC 30 has a function of, when a user performs an input operation using a cursor or the like displayed on the display 37 through input device 38, performing actions in response to the input operation.

The evaluation PC 40 is a server having a function of evaluating the status of communication between a plurality of devices (for example, the printer 20 and the user PC 30). The evaluation PC 40 is provided with a CPU 42 that performs various control operations, a ROM 43 that stores various control programs, a RAM 44 that temporarily stores data, a HDD 45 which is a large capacity memory and stores various application programs and various data files, and an I/F 46 that is capable of sending and receiving information to and from external apparatuses connected to the LAN 12. In addition, the evaluation PC 40 is further provided with a display 47 that displays a variety of information on a screen, an input device 48 such as a keyboard or the like with which a user inputs various commands, and the like. The evaluation PC 40 uses a reception buffer and a transmission buffer provided in certain areas of the RAM 44 when sending and receiving data to and from the printer 2D, the user PC 30 and like through the LAN 12. In the HDD 45, data such as filter information 50 that is used when extracting specific packets, a packet group 51 obtained by using the filter information 50, an evaluation source code creating program 52 that creates evaluation source codes 53 that evaluate a communication state, the evaluation source codes 53 that are executed when evaluating a communication state, overall results 57 which are evaluation results of communication, a test summary 58, difference results 59, and the like, are stored. A first source code 54, a second source code 55, a third source code 56 and the like are included in the evaluation source codes 53.

Furthermore, as illustrated in FIG. 2, the evaluation PC 40 is provided with a packet obtaining unit 60, a filtering unit 61, a source code creating unit 62, a source code executing unit 63, a test result generating unit 64, a difference result generating unit 65, a test result outputting unit 66, and the like, as a functional structure of a controller thereof. The packet obtaining unit 60 is capable of performing processing to obtain all packets flowing through the LAN 12 from the I/F 46. The filtering unit 61 performs processing to extract only packets that satisfy a predetermined condition from among the packets obtained by the packet obtaining unit 60 by using the filter information 50 (refer to FIG. 1) or the like. The source code creating unit 62 retrieves communication information as content of communication stored in the packets extracted by the filtering unit 61, determines an evaluation condition with which the content of communication is reproduced on the basis of the communication information, and performs processing to create and store in a specific area of the HDD 45 an evaluation source code capable of being executed by the CPU 42. The source code creating unit 62 is capable of creating an evaluation source code also from the packets obtained when the source code executing unit 63 executed an evaluation source code, and is also capable of creating an evaluation source code in which evaluation results generated by the test result generating unit 64 and the difference result generating unit 65 are reflected. The source code executing unit 63 performs processing to execute the evaluation source code created by the source code creating unit 62. The source code executing unit 63 also performs processing to obtain packets from the packet obtaining unit 60 when executing the evaluation source code. The test result generating unit 64 performs processing to generate the overall results 57 and the test summary 58 (refer to FIG. 1) regarding the executed source code. A more detailed description will be made below with reference to FIG. 6. The overall results 57 are text data that include data on whether or not execution of evaluation source codes was successfully performed and the test summary 58 is text data that includes summaries of content of execution of evaluation source codes. The test result generating unit 64 performs processing to output the overall results 57 and the test summary 58 to the source code creating unit 62 and the test result outputting unit 66. The difference result generating unit 65 performs processing to generate the difference results 59 (refer to FIG. 1), which is content regarding differences between a plurality of source codes. The difference results 59 are text data that describe content of parts that differ between two source codes. The difference result generating unit 65 performs processing to output the generated difference results 59 to the source code creating unit 62 and the test result outputting unit 66. The test result outputting unit 66 performs processing to output evaluation results, such as the overall test results 57, the test summary 58, the difference results 59 and the like, to the display 47 and the printer 20.

Figure 3:
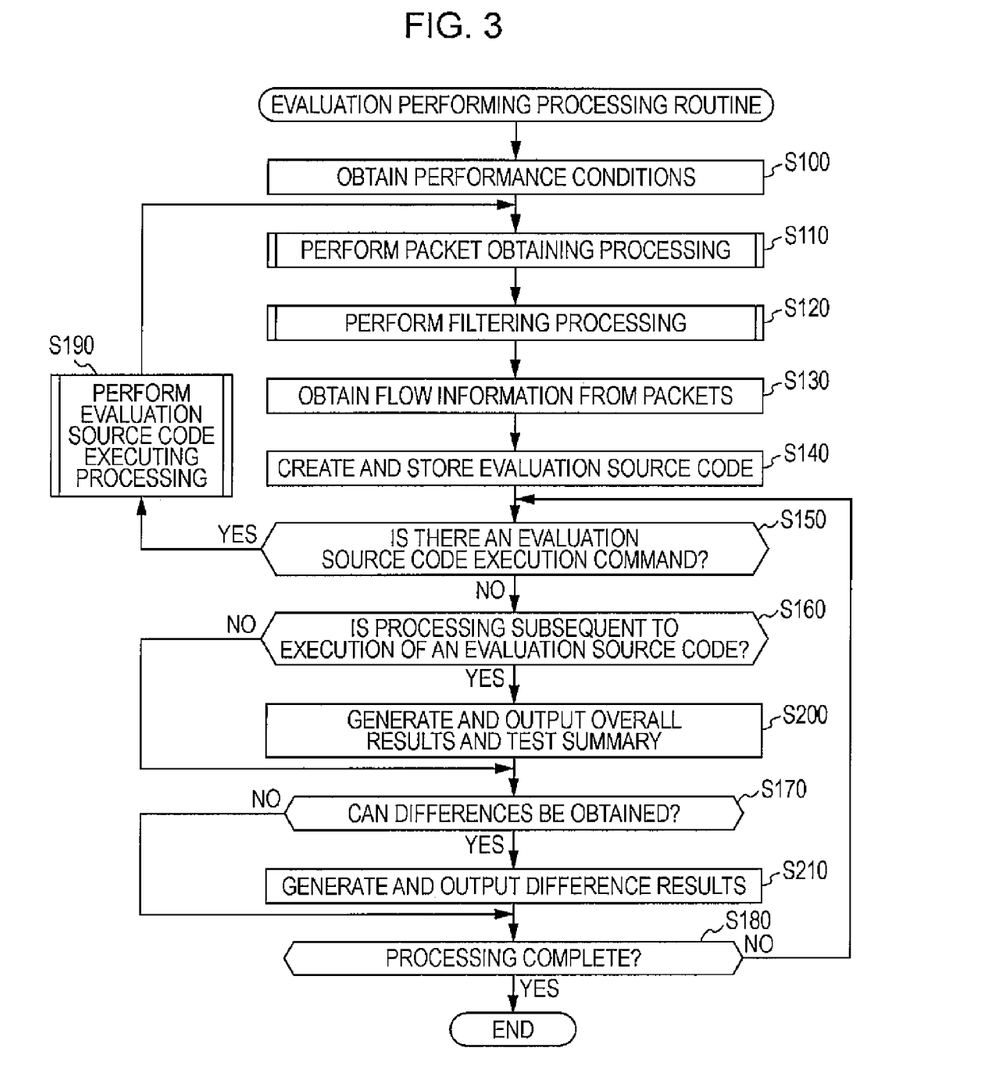
FIG. 3 is a flowchart illustrating an example of an evaluation performing processing routine.

Next, operation of the thus-structured communication evaluation system 10 of this embodiment will be described, beginning with processing performed to create evaluation source codes. Here, as a concrete example, description will mainly be given of processing in which the evaluation PC 40 obtains content of communication between the printer 20 and the user PC 30, creates an evaluation source code and then executes the evaluation source code to evaluate the content of the communication. FIG. 3 is a flowchart illustrating an example of an evaluation performing processing routine executed by the CPU 42 of the evaluation PC 40. This routine is stored in the HDD 45 and is executed after execution thereof is commanded through a main screen, which is not shown. Furthermore, this routine is executed by the CPU 42 by appropriately using the above-described packet obtaining unit 60, filtering unit 61, source code creating unit 62, source code executing unit 63, test result generating unit 64, difference result generating unit 65, test result outputting unit 66 and the like. During the execution of this routine, desired communication is performed between the printer 20 and the user PC 30.

Figure 4:
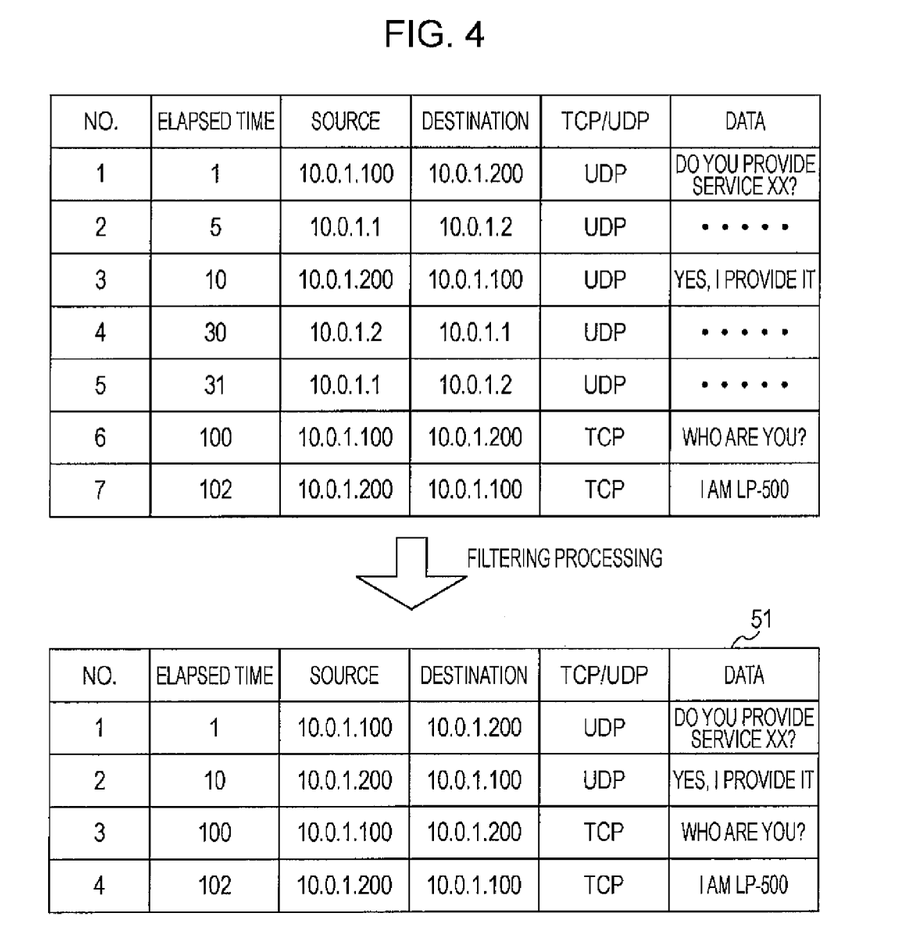
FIG. 4 is an explanatory view illustrating an example of packet obtaining processing and an example of filtering processing.

When this routine is executed, the CPU 42 first obtains performance conditions (step S100). The performance conditions are information input by a user through the main screen, which is not shown, such as between which devices packets of communication are to be obtained for, and for example are obtained by reading out the filter information 50 (refer to FIG. 1) or the like. In the filter information 50, information such as the IP address of a client (printer 20), the IP address of a server (user PC 30), a target port of server that creates a test source code, and the like is stored. Next, the CPU 42 performs packet obtaining processing by using the packet obtaining unit 60 (step S110) and performs filtering processing by using the filtering unit 61 (step S120). FIG. 4 is an explanatory view illustrating an example of the packet obtaining processing and the filtering processing. In the packet obtaining processing, all packets flowing through the LAN 12 are obtained (upper part of FIG. 4) and are stored in the HDD 45 as a packet group 51. Then, in the filtering processing, packets that match the IP address, port number, and the like described in the filter information 50 are extracted from the packets included in the packet group 51 (lower part of FIG. 4).

Figure 5:
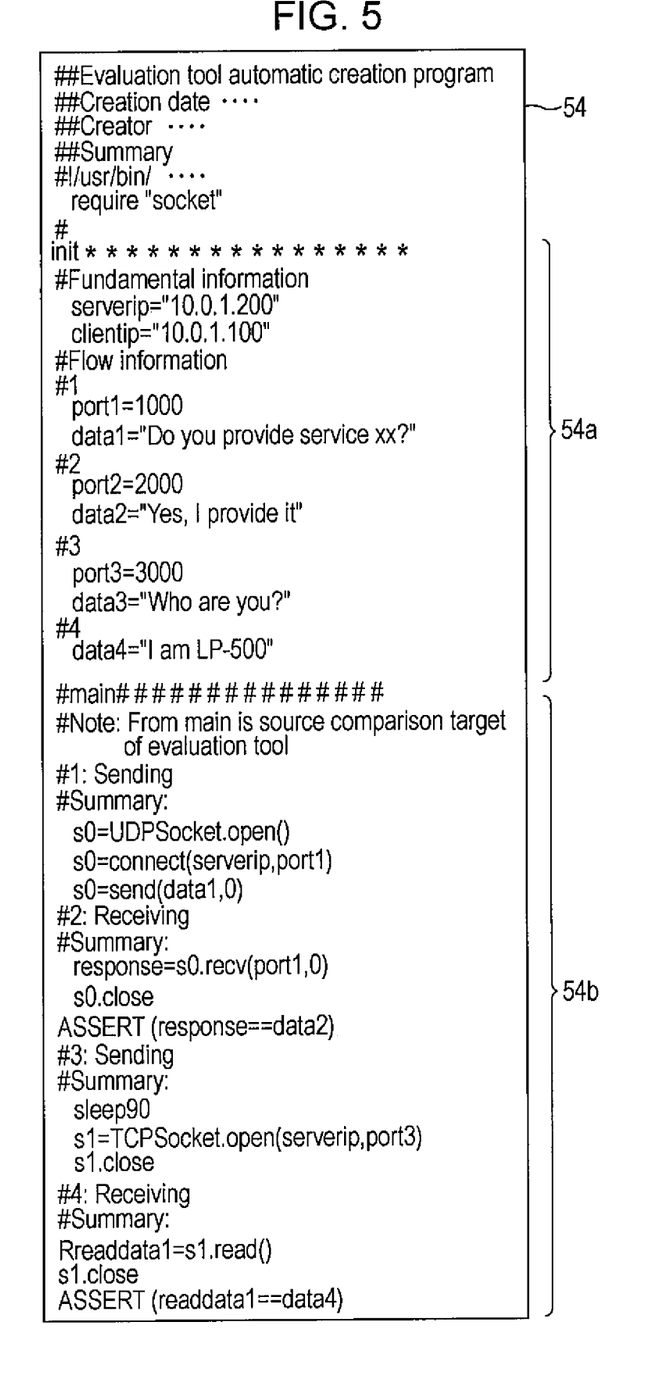
FIG. 5 is an explanatory view illustrating an example of a first evaluation source code 54.

Next, the CPU 42 uses the source code creating unit 62 and obtains flow information by reading out content of communication included in the extracted packets that are targets of evaluation this time (step S130), and creates and stores an evaluation source code in the HDD 45 (step S140). The flow information includes information regarding what information has been sent or received, in what order, and for what IP address. Here, processing for creating an evaluation source code will be specifically described. FIG. 5 is an explanatory view illustrating an example of the first evaluation source code 54 created by the source code creating unit 62. First, the source code creating unit 62 newly creates the first evaluation source code 54 using a predetermined format and then performs processing to write the content of the filter information 50 into a reference information area 54*a* as fundamental information. Next, for example, as shown in FIG. 4, the source code creating unit 62 performs processing to read out information stored in the extracted packets. Here, content of communication is included in which a packet having content of "Do you provide service XX?" was sent from the user PC 30 to the printer 20, a packet having content of "Yes, I provide it" was sent from the printer 20 to the user PC 30, a packet having content of "Who are you?" was sent from the user PC to the printer 20, and a packet having content of "I am LP-500" was sent from the printer 20 to the user PC 30. Then, the source code creating unit 62 performs processing to read out content of communication from the respective packets and write the content into the reference information area 54*a* of the first evaluation source code 54 as flow information. Next, the source code creating unit 62, on the basis of the flow information, performs processing to create a source code with which the content of communication of the packets is reproduced by the source code executing unit 63, on the basis of the flow information, and to write the created source code into the evaluation condition area 54*b*. In this way, the first evaluation source code 54 shown in FIG. 5, which can be executed, is created. Here, the format of the evaluation source code is set so that a "#Summary" line is provided at the end of each line of the flow after which comments and the like can be written by a user. In addition, the source code creating unit 62 may create the source code also on the basis of predetermined evaluation values. Specifically, for example, if the interval between the current flow and the next flow is 100 ms, the source code creating unit 62 may create a source code that includes processing to enter sleep or the like every 100 ms.

Next, the CPU 42 determines whether or not there is an execution command for the evaluation source code on the basis of whether such a command has been input using the main screen, which is not shown, (step S150), and when there is no execution command for the evaluation source code, the CPU 42 determines whether or not the processing is subsequent to execution of an source code (step S160). When the processing is not subsequent to execution of an evaluation source code, the CPU 42 determines whether new differences between two evaluation source codes can be obtained on the basis of the number of evaluation source codes stored in the evaluation source codes 53 or the like (step S170), and when new differences cannot be obtained the CPU 42 determines whether or not the processing is complete on the basis of whether or not an input has been made using the main screen, which is not shown, (step S180). When the processing is not complete, the processing is repeatedly performed from step S150. Then, when there is an execution command for the evaluation source code in step S150, the CPU 42 performs processing to execute the evaluation source code by using the source code executing unit 63 (step S190) and then performs processing from step S110. Here, the evaluation PC 40 takes the place of the printer 20 and executes the content shown in the flow information of FIG. 5. Furthermore, packet obtaining processing and filtering processing and source code creating processing are performed in parallel with processing to execute the evaluation source code. That is, the CPU 42 reproduces content of communication between the printer 20 and the user PC 30, between the evaluation PC 40 and the user PC 30, extracts and obtains the communication packets thereof, and creates a new evaluation source code (herein, second evaluation source code 55) from the content of the obtained packets.

Figure 6:
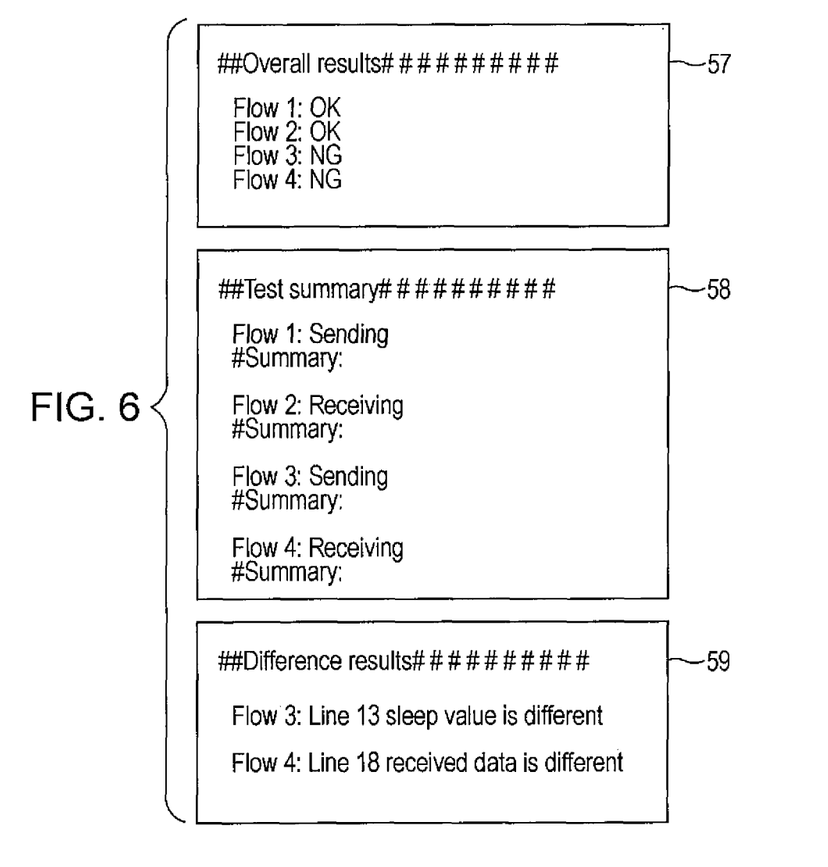
FIG. 6 is an explanatory view illustrating examples of overall results 57, a test summary 58, and difference results 59.

After the evaluation source code has been executed in step S190, the CPU 42 determines that the processing is subsequent to execution of an evaluation source code in step S160 and generates the overall results 57 and the test summary 58, which are performance results of the evaluation source code, by using the test result generating unit 64, and together with the overall results 57 and the test summary 58 then being output and stored in the HDD 45 by the test result outputting unit 66, they are also output and displayed on the display 47 (step S200). FIG. 6 is an explanatory view illustrating examples of the overall results 57, the test summary 58 and the difference results 59. As illustrated in FIG. 6, in the overall results 57, information is recorded expressing whether or not performance of evaluation of communication was possible using the conditions of the first evaluation source code 54, and in the test summary 58, text of content executed by the first evaluation source code 54 (sending or receiving) and the summary are recorded. Whether or not content of communication between the printer 20 and the user PC 30 has been reproduced as content of communication between the evaluation PC 40 and the user PC 30 can be easily determined by a user checking this content.

However, since the first evaluation source code 54 and the second evaluation source code 55 are included in the evaluation source codes 53, the CPU 42 determines that differences can be obtained in step S170, generates the difference results 59 between the first evaluation source code 54 and the second evaluation source code 55 by using the difference result generating unit 65 and together with outputting and storing the difference results 59 in the HDD 45 by using the test result outputting unit 66, the difference results 59 are also output and displayed on the display 47 (step S210). As illustrated in FIG. 6, by a user checking the content of the difference results 59, parts that are different between the content of communication between the printer 20 and the user PC 30, and the content of communication between the evaluation PC 40 and the user PC 30 become clear. Then, the user performs a process of considering these evaluation results and rewriting necessary parts of the first evaluation source code 54 and the second evaluation source code 55. By executing the rewritten evaluation codes and the like, problematic points are made clear and the content of communication can be made to be more and more appropriately structured. For example, processing is performed to simply shift content that has been determined to always differ by using the differences, for example, the "model name" and the like of the printer 20 differs from those of the evaluation PC 40, from the evaluation conditions of the evaluation condition area 54*b* to the reference information of the reference information area 54*a*.

When it is determined that there is an execution command for the second evaluation source code 55 in step S150, the CPU, 42 performs processing to execute the second evaluation source code 55 in step S190, similarly to the above-described processing, and, in steps S110-S140, performs processing to extract packets including content of communication at this time and create a new evaluation source code (herein, third evaluation source code 56). In this way, since evaluation source codes can be repeatedly created, when differences therebetween are considered, evaluation conditions that always differ (for example, model name and print job ID), evaluation conditions that always change (for example, number of repetitions n that processing is repeated for and a waiting time) and the like can be made clear. Then, a user can grasp this content and the content can be reflected in the first evaluation source code 54, the second evaluation source code 55, the third evaluation source code 56 and the like. Furthermore, these evaluation source codes having the content reflected therein are executed and differences between expected evaluation results and current performance results can be grasped from evaluation results such as difference results or the like, and by incorporating the grasped content of differences into the next evaluation source code, a cycle of improving a new device and evaluating a communication state can be repeated, and development of the new device and improvement of the communication state can be more easily advanced.

Here, the correspondence relationship between the structural elements of the present embodiment and the structural elements of the aspect of the invention will be made clear. Packets of the present embodiment correspond to communication data of the aspect of the invention, the packet obtaining unit 60 corresponds to the communication obtaining unit, the program creating unit corresponds to the source code creating unit 62, the test result generating unit 64 and the difference result generating unit 65 correspond to the result generating unit, and the evaluation source code corresponds to the test program. The term "plurality of devices" used when creating the first test program of the aspect of the invention corresponds to the printer 20 and the user PC 30, and the terms "test-target device" and "other device" used when creating the second test program of the aspect of the invention, correspond to the evaluation PC 40 and the user PC 30, respectively.

According to the communication evaluation system 10 of the present embodiment described in detail above, the communication state of a device is evaluated by obtaining packets that include content of communication between a plurality of devices (printer 20 and user PC 30), creating the first evaluation source code 54 on the basis of the content of communication included in the obtained packets, the first evaluation source code 54 to be executed when performing communication between the evaluation PC 40, serving as the test-target device, and the user PC, serving as the other device, executing the created first evaluation source code 54 and generating performance results regarding communication performed between the evaluation PC 40 and the user PC 30. In this way, the evaluation source code is created by using packets that have been actually been communicated and the test of the evaluation PC 40 is performed by using this evaluation source code. Consequently, for example, communication testing can be made more automatic, communication between the test-target device and the other device can be optimized by using the performance results for the performed communication, and this test program can be used in the development of new devices. Therefore, the communication state of a device can be evaluated more easily. Furthermore, since the difference results 59 between the first evaluation source code 54 and the second evaluation source code 55 are output, differences between the content of communication in the first evaluation source code 54 and the content of communication in the second evaluation source code 55 can be more easily evaluated by using the difference results 59. In addition, by creating the first evaluation source code 54 with an old device and the second evaluation source code 55 with a new device, differences of the communication state of the new device can be more easily grasped and therefore development of devices becomes easier.

Furthermore, since the evaluation results of communication between the printer 20 and the user PC 30 and the evaluation results of communication between the evaluation PC 40 and the user PC 30 can be obtained, differences between content of communication with a device different from the evaluation PC 40 and content of communication with the other device can be more easily evaluated. Still furthermore, since packets are obtained that include content of communication performed between the evaluation PC 40 and the user PC 30 when executing the first evaluation source code 54, the overall results 57 are generated regarding whether or not communication of content included in the obtained packets could be performed, and the generated overall results 57 are output and displayed on the display 47 in the form of text, performance results regarding whether or not communication between devices was able to be performed can be confirmed visually. Then, since a content-evaluation source code is created in which content of communication included in packets is reproduced, whether or not the communication state of a device has been correctly reproduced can be more easily evaluated. Then, since the first evaluation source code 54 is created, which includes the evaluation condition area 54b in which evaluation conditions are recorded and the reference information area 54a in which evaluation conditions not to be used in the test are recorded, conditions that are not used in the test are simply moved to the reference information area 54a and evaluated results are more easily reflected in the evaluation source code.

The invention is in no way limited to the above-described embodiment and it goes without saying that the invention can be implemented by using various embodiments so long as they fall within the technical scope of the invention.

For example, in the above-described embodiment, the evaluation PC 40 creates the first evaluation source code 54 by obtaining content communicated between the printer 20 and the user PC 30, but the user PC 30 may create the first evaluation source code 54 by using the evaluation source code creating program 35b provided in the user PC 30. Furthermore, the evaluation source code creating program may be installed in the printer 20 and the first evaluation source code 54 may be created in the printer 20. That is, provided that packets flowing through the LAN 12 can be obtained, the evaluation source code creating program may be executed by any device. Similarly, in the above-described embodiment, the evaluation PC 40 creates the second evaluation source code 55 on the basis of content of communication between the evaluation PC 40 and the user PC 30, but the second evaluation source code 55 may be created by the user PC 30, or the evaluation source code creating program may be installed in a printer being newly developed and the second evaluation source code 55 may be created by this newly developed printer.

In the above-described embodiment, the overall results 57 and the difference results 59 are output as evaluation results, but either one of the results may be output instead. With this, by using either one of the overall results 57 and the difference results 59, the communication state of a device can be more easily evaluated. Furthermore, the content of communication can be made more concrete by using the first evaluation source code 54 and the second evaluation source code 55.

In the above-described embodiment, the second evaluation source code 55 and the third evaluation source code 56 are created, but these source codes may be omitted. With this, by using the overall results 57 and the test summary 58, the communication state of a device can be more easily evaluated. Furthermore, packets that include content of communication between the evaluation PC 40 and the user PC 30 may be obtained and the first evaluation code 54 may be created. When this is done, the content of communication of the evaluation PC 40 can be reproduced by using the evaluation source code.

In the above-described embodiment, the second evaluation source code 55 and the third evaluation source 56 are created by using the content of packets as it is. However, the second evaluation source code 55 and the third evaluation source code 56 may be created so as to have the content of the overall results 57 and the difference results 58 reflected therein. For example, when there are different values in the first evaluation source code 54 and the second evaluation source code 55, an evaluation source code may be created that omits (does not record in the evaluation condition area 54b) either one of a test condition that does not match and forms this difference and a test condition that has changed. When this is done, since a new evaluation source code can be created by using the difference information, the method of evaluating the communication state can provide a greater variety of ways of evaluating the communication state. Furthermore, the communication state of a device can be more easily evaluated by omitting test conditions that are not necessary as evaluation targets. At this time, it is preferable to repeatedly create evaluation source codes, output difference information that includes at least one of an evaluation condition that always does not match and an evaluation condition that always changes by using repeatedly created difference information, and omit certain test conditions by using the difference information. When this is done, test conditions that may be evaluated can be more narrowed down. Furthermore, it is preferable to write the omitted conditions into the reference information area 54a. When this is done, afterwards when a user has checked the omitted conditions, improvement of the operation of shifting conditions to the evaluation condition area 54b and the like is easily performed.

In the above-described embodiment, an apparatus that evaluates a communication state of a device has been described that is used in communication evaluation when developing a new device. However, the invention is not particularly limited to this and may also be applied to a device that communicates in a state using an ordinary LAN 12. In this case, the evaluation source code creating program specifically helps to identify problematic points in normal communication operations.

Figure 7:
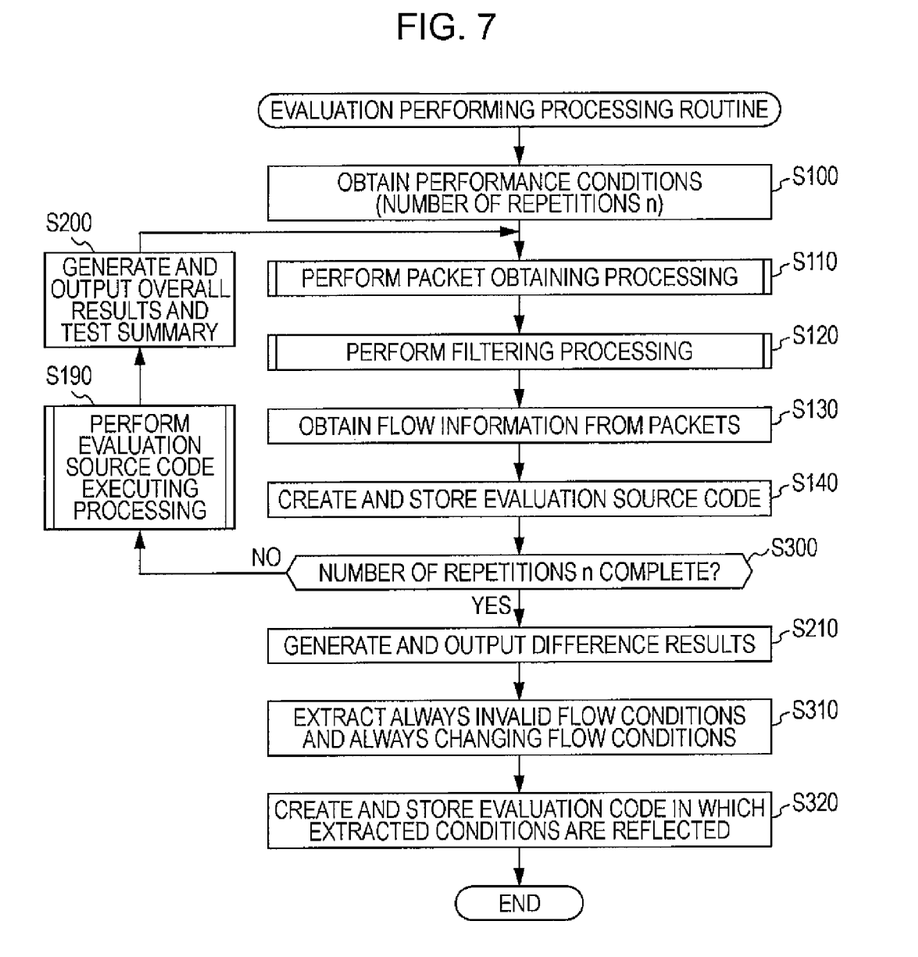
FIG. 7 is a flowchart illustrating an example of another evaluation performing processing routine.
Figure 8:
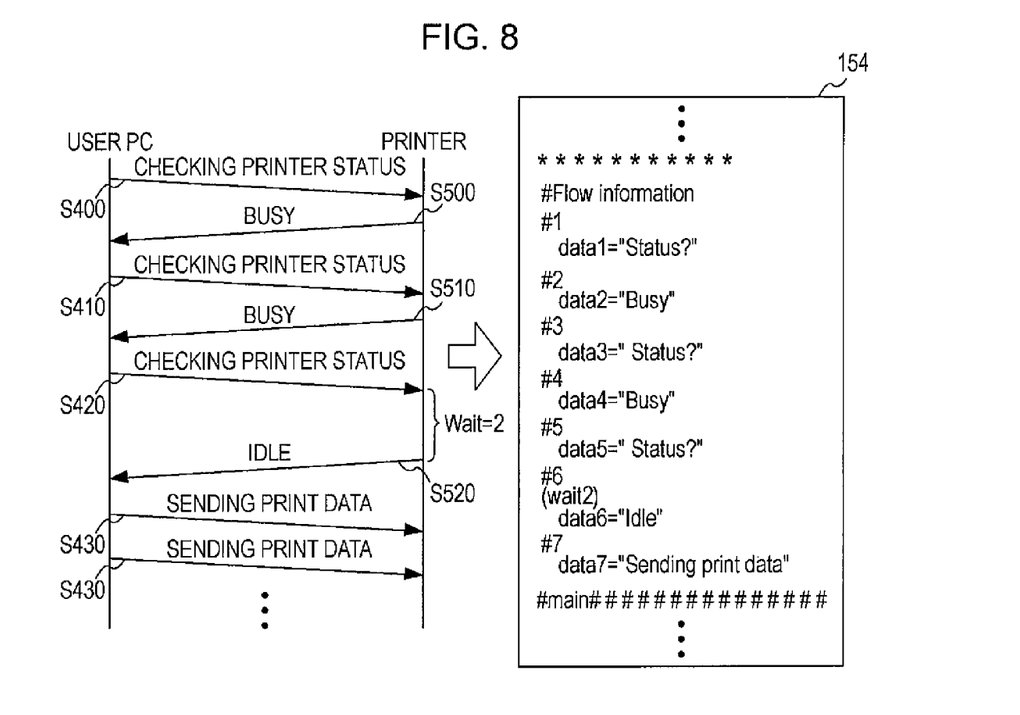
FIG. 8 illustrates content of communication between a user PC 30 and a printer 20 and the evaluation source code.
Figure 9:
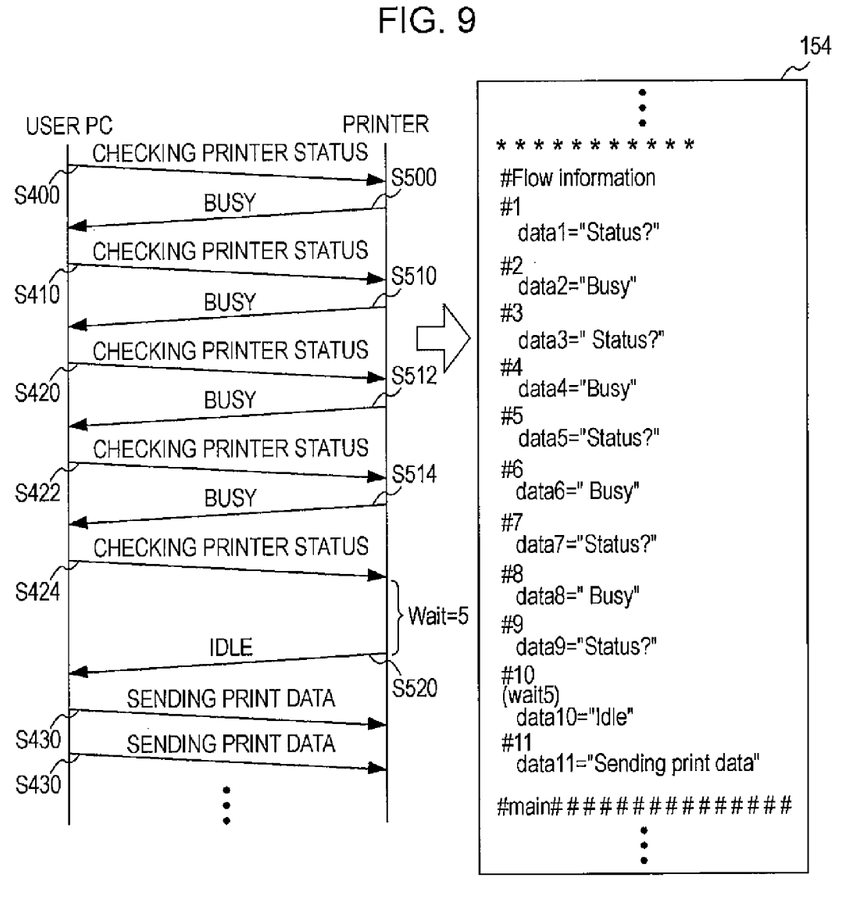
FIG. 9 illustrates the content of communication between the user PC 30 and the printer 20 and the evaluation source code.

In the above-described embodiment, content of communication originally performed between the printer 20 and the user PC 30 and content of communication between the evaluation PC 40 (test subject) and the user PC 30 are evaluated. However, communication of content between the test-target device and the other device may be repeatedly performed and test conditions necessary for evaluation and test conditions not necessary for the evaluation may be extracted. FIG. 7 is a flowchart illustrating an example of another evaluation performing processing routine. FIGS. 8 and 9 are timing charts illustrating communication between the user PC 30 and the printer 20, and evaluation source codes 154. In the evaluation performing processing routine illustrated in FIG. 7, steps that are the same as those of the above-described embodiment are denoted by the same step numbers and description thereof is omitted. Here, the test-target device is made to be the printer 20 and the other device is made to be the user PC 30 and execution of the evaluation performing processing routine by the CPU 32 of the user PC 30 will be described. This routine is executed after a command for setting evaluation conditions has been received via the main screen, which is not shown. When this routine is initiated, the CPU 32 obtains performance conditions including a number of repetitions n in step S100, performs packet obtaining processing when the printer 20 and the user PC 30 are communicating with each other in step S110, performs filtering processing in step S120, obtains flow information from the packets in step S130, creates and stores an evaluation source code in step S140, and determines whether or not the number of repetitions n has been reached (step 300). When the number of repetitions n has not yet been reached, evaluation source code executing processing is performed in step S190, overall results and a test summary are created and output in step S200, and then, processing from step S110 is repeated and pluralities of the first evaluation source code, the overall results and the test summary are created. Then, when the number of repetitions n has been reached in step S300, all of the difference results are generated and output in step S210. Then, content of the difference results is analyzed and test conditions that are always invalid and test conditions that always change are extracted (step S310). Test conditions that are always invalid include the model name, the print job ID and the like, and test conditions that always change include, for example, the waiting time, the number of repetitions of request and reply processing, and the like. Then, by making the extracted test conditions be excluded evaluation conditions, a first evaluation source code in which the extracted test conditions are reflected is created and stored in the HDD 35 (step S320). This routine is then complete. As illustrated in FIG. 8, in a case such as where, after a predetermined waiting time has elapsed after repeatedly performing printer status obtaining processing (steps S400-S420) and outputting of "busy" in reply to this processing (steps S500-S510), "idle" is output from the printer 20 (step 520) and print data is sent from the user PC 30, for example, as shown in FIG. 9, when a case in which the number of repetitions of printer status obtaining processing and outputting of "busy" is different and the waiting time is different is repeatedly performed and evaluation source codes and the evaluation results are output, the CPU can determine that the number of repetitions is an arbitrary number and that the waiting time changes. Then, by writing conditions that are always invalid and conditions that always change into the reference information area and not into the evaluation condition area, content of evaluation results can be narrowed down to only that which is necessary. In this way, by repeatedly performing communication, for example, since the CPU 32 can extract evaluation conditions that always do not match, evaluation conditions that always change, and the like, the CPU 32 can create a test program narrowed down to content of communication that is more desired to be evaluated and the CPU 32 can more easily evaluate a communication state of a device. Furthermore, even if temporary exclusion of test conditions by repeated performance of the evaluation source code creating program was a mistake, if a user analyzes the content of the evaluation source code itself and the evaluation results (overall results, test summary and difference results), correction such that the temporarily excluded test conditions are added to the evaluation conditions can be more easily performed.

In the above-described embodiment, devices of the embodiment of the invention have been described as being the printer 20, the user PC 30 and the evaluation PC 40, but as long as they are devices that perform communication with other devices, the embodiment of the invention is not particularly limited to them, and devices of an embodiment of the invention may be, for example, various types of computers including servers and workstations such as fixed desktop computers, mobile notebook-type computers, and the like, various types of video appliances such as televisions and video players, HDD recorders, DVD players, photo viewers and the like, various types of image processing devices such as digital cameras, digital camcorders, scanners, printers and the like, various types of communication devices such as fixed-line telephones and mobile telephones, fax machines and the like, and various types of games machines such as fixed and mobile games machines. Furthermore, the device may be a controller or the like.

The entire disclosure of Japanese Patent Application No. 2008-299572, filed Nov. 25th, 2008 is expressly incorporated by reference herein.

What is claimed is:

1. An information processing method for evaluating a communication state of a device, comprising:
    (a) obtaining communication data that includes content of communication between a plurality of devices;
    (b) creating a first test program to test communication between a test-target device and an other device, on the basis of the content of communication included in the communication data obtained in (a), the first test program to be executed when performing communication between the test-target device and the other device;
    (c) executing the first test program created in (b) and generating performance results regarding communication performed between the test-target device and the other device;
    (d) obtaining communication data that includes content of communication performed between the test-target device and the other device when executing the first test program created in (b);
    (e) creating a second test program on the basis of the content of communication included in the communication data obtained in (d), the second test program to be executed when performing communication between the test-target device and the other device;
    (f) outputting difference information obtained by comparing at least one part of content between the first test program created in (b) and the second test program created in (e); and
    (g) excluding predetermined test conditions from evaluation conditions by using the difference information and creating a third test program that is to be executed when performing communication between the test-target device and the other device.

2. The information processing method according to claim 1, wherein,
    in (a), communication data is obtained that includes content of communication between a device, which is different from the test-target device, and the other device;
    in (b), the first test program is created on the basis of the content of communication between the device, which is different from the test-target device, and the other device obtained in (a); and
    in (c), the first test program created in (b) is executed and performance results are generated regarding communication performed between the test-target device and the other device.

3. The information processing method according to claim 1, wherein, in (a), communication data that includes content of communication between the test-target device and the other device is obtained.

4. The information processing method according to claim 1, wherein in (c), communication data is obtained that includes content of communication performed between the test-target device and the other device when executing the first test program created in (b), performance results are generated regarding whether content included in the obtained communication data was able to be communicated or not and the generated performance results are output in a visible manner.

5. The information processing method according to claim 1, wherein, in (b), a program for testing content is created in which content of communication included in the communication data is reproduced.

6. The information processing method according to claim 1, wherein, in (b), the first test program is created to include an evaluation condition area in which an evaluation condition is recorded under which communication between the test-target device and the other device is to be tested and a reference information area in which an evaluation condition that is not to be used in the test is recorded.

7. An information processing method for evaluating a communication state of a device, comprising:
    (a) obtaining communication data that includes content of communication between a plurality of devices;
    (b) creating a first test program to test communication between a test-target device and an other device, on the basis of the content of communication included in the communication data obtained in (a), the first test program to be executed when performing communication between the test-target device and the other device;
    (c) executing the first test program created in (b) and generating performance results regarding communication performed between the test-target device and the other device,
    wherein (a) and (b) are repeatedly performed and a plurality of first test programs are created, and the information processing method further comprises:
    (d) performing comparison of at least one part of content between the plurality of first test programs created in (b) and outputting difference information that includes at least one of an evaluation condition that always does not match between the plurality of first test programs and an evaluation condition that always changes between the plurality of first test programs.

8. The information processing method according to claim 7, further comprising:
    (e) excluding predetermined test conditions from evaluation conditions by using the difference information and creating a second test program to be executed when performing communication between the test-target device and the other device.

9. The information processing method according to claim 7, wherein in (c), communication data is obtained that includes content of communication performed between the test-target device and the other device when executing the first test program created in (b), performance results are generated regarding whether content included in the obtained communication data was able to be communicated or not and the generated performance results are output in a visible manner.

10. The information processing method according to claim 7, wherein, in (b), a program for testing content is created in which content of communication included in the communication data is reproduced.

11. The information processing method according to claim 7, wherein, in (b), the first test program is created to include an evaluation condition area in which an evaluation condition is recorded under which communication between the test-target device and the other device is to be tested and a reference information area in which an evaluation condition that is not to be used in the test is recorded.

12. An information processing apparatus that evaluates a communication state of a device, comprising:
   a communication obtaining unit that obtains communication data including content of communication between a plurality of devices;
   a program creating unit that creates a first test program to test communication between a test-target device and an other device, on the basis of the content of communication included in the obtained communication data, the first test program to be executed when performing communication between the test-target device and the other device;
   a result generating unit that executes the created first test program and generates performance results regarding communication performed between the test-target device and the other device,
   wherein the communication obtaining unit and the program creating unit are repeatedly operated to create a plurality of first test programs, and the information processing apparatus further comprises:
   a comparison unit that compares at least one part of content between the plurality of first test programs and outputs difference information that includes at least one of an evaluation condition that always does not match between the plurality of first test programs and an evaluation condition that always changes between the plurality of first test programs.

13. The information processing apparatus according to claim 12, further comprising:
   an excluding unit that excludes predetermined test conditions from evaluation conditions by using the difference information and creating a second test program to be executed when performing communication between the test-target device and the other device.

* * * * *